March 25, 1958 R. M. SHERMAN ET AL 2,827,921
LOW TORQUE INSTANT CLOSING CHECK VALVE
Filed March 12, 1954 3 Sheets-Sheet 1

INVENTORS
ROGER M. SHERMAN
ROBERT E. FOX
BY UBY FARRARI
ATTORNEY

March 25, 1958 R. M. SHERMAN ET AL 2,827,921
LOW TORQUE INSTANT CLOSING CHECK VALVE
Filed March 12, 1954 3 Sheets-Sheet 2
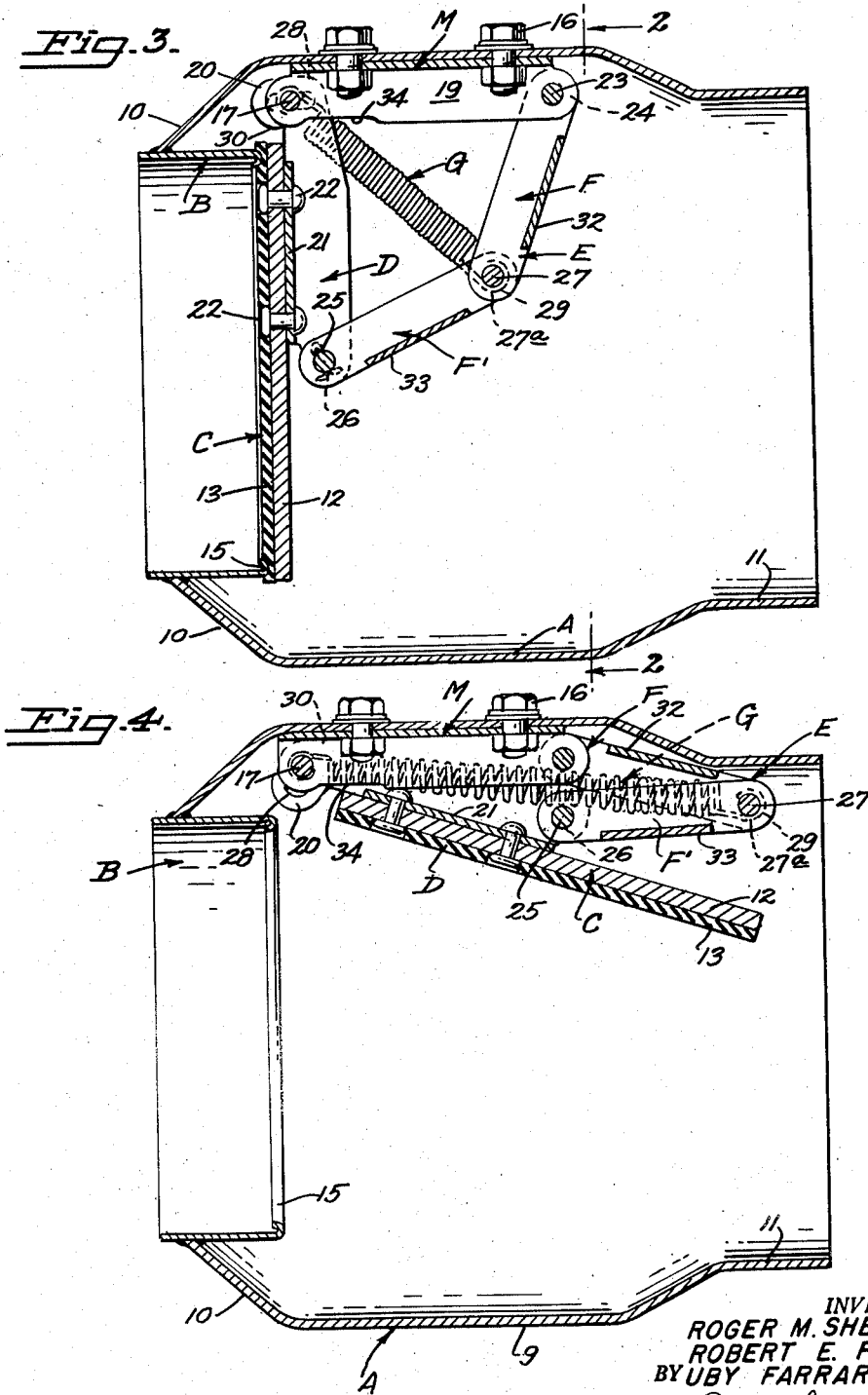
INVENTORS
ROGER M. SHERMAN
ROBERT E. FOX
BY UBY FARRARI
ATTORNEY March 25, 1958  R. M. SHERMAN ET AL  2,827,921
LOW TORQUE INSTANT CLOSING CHECK VALVE
Filed March 12, 1954  3 Sheets-Sheet 3
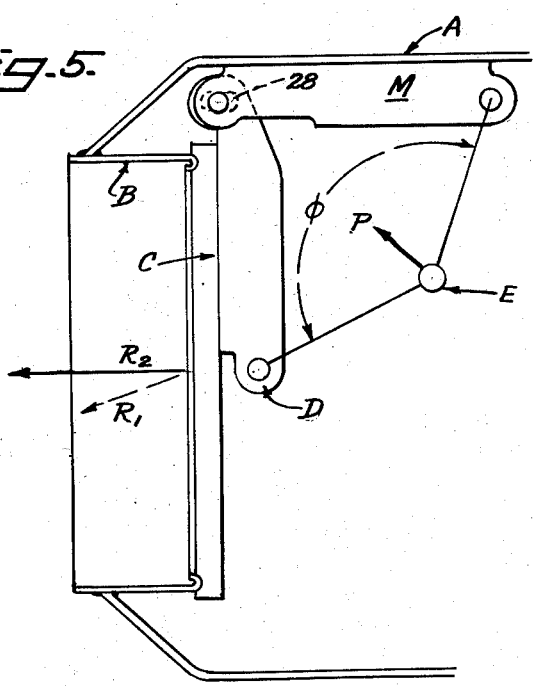
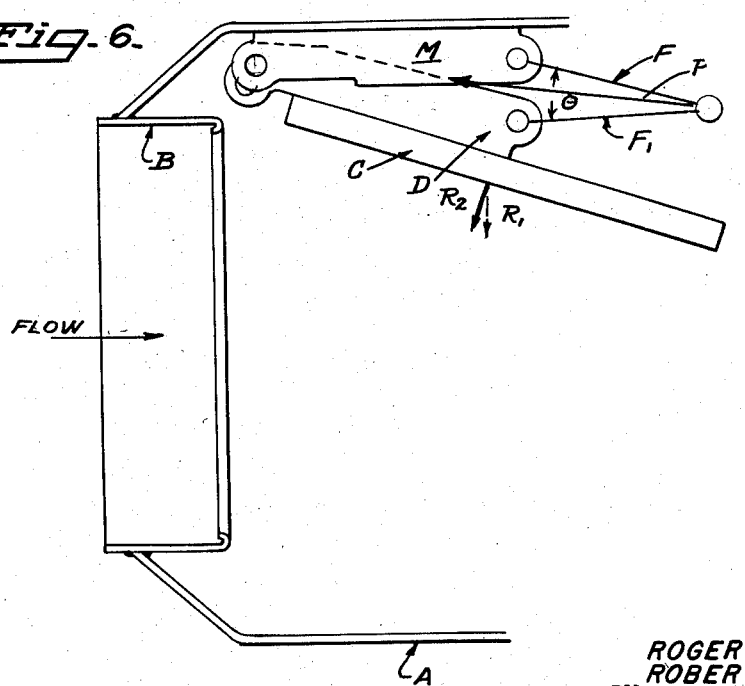
INVENTORS
ROGER M. SHERMAN
ROBERT E. FOX
BY UBY FARRARI
ATTORNEY United States Patent Office 2,827,921
Patented Mar. 25, 1958

2,827,921

LOW TORQUE INSTANT CLOSING CHECK VALVE

Roger M. Sherman, Palo Alto, Robert E. Fox, Redwood City, and Uby Ferrari, Palo Alto, Calif.

Application March 12, 1954, Serial No. 415,894

5 Claims. (Cl. 137—527)

This invention relates to check and foot valves generally and, in particular, to a check or foot valve that has a toggle joint closure mechanism that will offer a minimum of resistance to fluid flow through the valve, yet which will act positively to close the valve just before a column of liquid moving through the valve can stop and reverse its direction of flow.

It is customary in the transportation of liquids to use both check and foot valves to seal off a head of liquid within the system so that the column will be retained and not lost by drainage when movement of the liquid ceases. A familiar example is the use of either a check or foot valve to hold a column of liquid within a pump by sealing off the pump's discharge or intake ends, respectively, so that the pump remains primed during periods of non-use. In such use it is particularly important that the foot or check valve provide an absolute seal so that there is no liquid drainage or leakage of air which will destroy the priming, particularly if the valve is to be used in connection with a primer, such as an exhaust or suction primer.

A particular defect of conventional check and foot valves of both the "swing" and "ball" check types is a failure to provide an adequate leak-tight seal sufficient to prevent leakage or loss of suction. In an effort to overcome this defect, various valve structures have been employed to provide a better seal, in most cases including a spring load on the valve, urging it firmly into contact with the valve seat. However, regardless of the particular manner in which the positive closing pressure is applied, each of these prior art valves has in common the defect of an excessive friction drag or pressure drop across the valve during operation. Such a pressure drop occurs as a result of the resistance to flow created by the spring load or other pressure-applying means used to tightly seal the valve, which must be overcome by the moving column of liquid in order to maintain the valve in an open position. As a result, additional horsepower must be developed by the pump, solely for the purpose of holding the valve open, at a considerable loss in economy.

A further disadvantage of most prior art check and foot valves is the lack of any completely adequate protection against sudden or quick closing of the valve. This is particularly true of the standard "swing" check valve which is not spring loaded. It frequently occurs that such valves will get rusty and tend to stick in an open position so that a considerable reverse velocity of the water column will develop before the valve will close. When the valve does close, it is apt to do so with a tremendous slam, creating a "water hammer" effect. This effect occurs because the kinetic energy of the moving water column cannot be absorbed, since the liquid is nearly incompressible, and therefore appears as an instantaneous shock which may be of sufficient intensity to injure pipe, fittings, or the pump.

The present invention is directed to a solution of the above and many additional problems, as will appear, and one object of the invention is to provide a unitary, spring-loaded check-and-foot valve structure that not only insures a positive valve-closing action providing an absolute leak-tight seal, but which also prevents excessive pressure drops across the valve during operation without endangering the sysetm through retarded or faulty valve action.

Another object of the present invention is to provide a check and foot valve with a spring-loaded toggle action that will act to close the valve just prior to any reversal of fluid flow through the valve so that the danger of water hammer resulting from the valve action will be virtually eliminated.

Another object of the invention is to provide a valve-closing toggle linkage which operates by pressure applied on a knee joint of the linkage to multiply the closing pressure on the valve in its closed position, but which also operates by a reverse linkage to substantially reduce the pressure, tending to close the valve in an open position so that a minimum of pressure is required to maintain the valve in its open position.

Another object is to provide a toggle linkage that will assume a relatively flat obtuse angle in the closed position of the valve where a minimum spring load is required to maintain a leak-tight valve seal, and which will assume a relatively pointed acute angle in the valve open position and yet the increased spring load will not produce a valve-closing force as great as that produced by the spring in the closed position of the valve.

Another object of the invention is to provide a spring-loaded toggle means for closing a check or foot valve that will act to produce a maximum valve-closing force in a closed-valve position with diminishing valve-closing forces resulting as the valve is moved to an open position. As a result, the valve action will produce the dual advantages of a minimum pressure drop across the valve while open, and a safe, slow-starting but gradually accelerating valve-closing action when the flow slows down.

Other objects and advantages of the present invention will appear from the following description and from the drawings in which:

Fig. 3 is a view in vertical section along the line 3—3 of Fig. 2;

Fig. 4 is a like view showing a fully-open position of the valve;

Fig. 5 is a diagrammatic view, corresponding to the closed-valve position of Figs. 1–3, showing the spring pressure applied to the valve-closure mechanism in relation to the closing pressures actually imparted to the valve itself; and Fig. 6 is a like view, corresponding to the fully-open position of Fig. 4, likewise showing the relation between spring and valve closing pressures.

Figure 1:
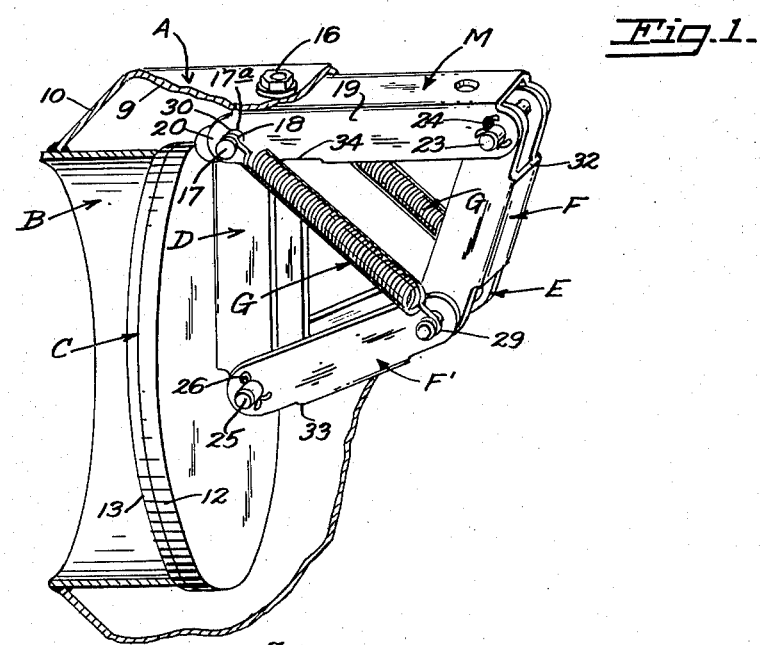
Fig. 1 is a view in perspective of a check-and-foot-valve construction according to the present invention, showing the valve in its closed position and with portions of the valve body broken away for the sake of clarity.
Figure 2:
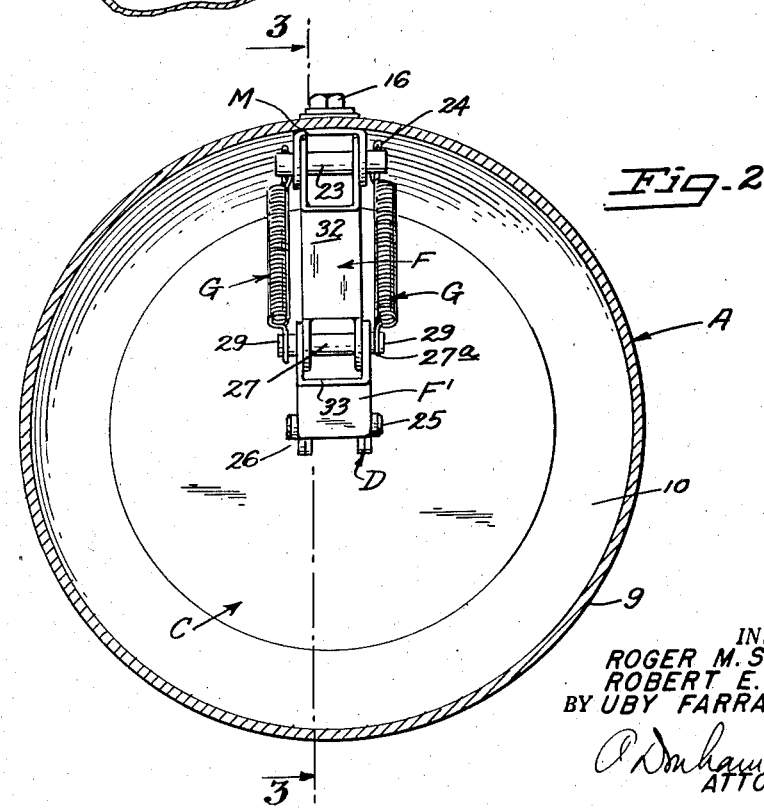
Fig. 2 is a view in vertical section of the device of Fig. 1, along the line 2—2 of Fig. 3, likewise showing the valve in its closed position.

In a broad view the present invention includes a valve body A having a valve seat B; a valve or clapper C adapted to engage the valve seat in leak-tight fashion; a hinge blade member D mounting the valve for movement between open and closed positions relative to the valve seat; and a spring-loaded toggle means E including links F, F' and springs G. In its general operation the toggle linkage E exerts a closing pressure on the valve C through the action of the springs G, tending to straighten out the linkage. Because of the unique arrangement of parts, the angles formed between the links F, F' in various valve positions are such that the closing pressure exerted by the springs G is multiplied by the linkage when the valve is in a closed position, but, by a reverse linkage, is diminished when the valve is in an open position, as will be more fully explained below. As a result, a more efficient valve is produced since the pressure drop or horsepower loss involved in keeping the valve open is reduced to a minimum and the force of the springs is multiplied as the flow slows down so that the valve will be brought quickly to its closed sealed position.

Referring to the drawings in detail, A indicates a valve body which may include a generally cylindrical shell portion 9 tapering to reduced end portions 10 and 11 adapted for welding to suitable couplings which are not shown. Rigidly secured in the end 10, as by welding, is the valve seat B which extends inwardly into the valve body A. Preferably, the valve seat is provided with an annular, curled flange 15 on its inner edge. Adapted to engage the flange 15 of the valve seat B in a sealing relation is the valve or clapper C. The valve C may take any conventional form, but is illustrated as a circular metal disc 12 faced by a sealing disc 13 which may be fabricated of a suitable, resilient, compressible material, such as rubber, so that a leak-tight seal will be provided when the valve A is pressed firmly into contact with the valve seat B.

Rigidly secured to the shell 9 of the valve body, by cap screws 16, is the mounting channel M. The hinge blade member D is pivotally supported from the channel M by a hinge pin 17 extending outwardly through circular bearing holes 18 in the sides 19 of the mounting channel M. Preferably the hinge blade D is also channel-shaped and has elongated perforations in its ears 20 through which pass the extending ends of the hinge pin 17. Annular grooves 17a near the ends of the pin 17 receive the looped ends 30 of the springs G and hold the pin 17 in place. The elongated perforations 28 in the blade D allow the valve clapper C to seat itself evenly on the valve seat 15 under influence of the pressure applied by the toggle linkage E.

The valve C is rigidly secured to a cross portion 21 of hinge D, as by rivets 22, and, consequently, moves with the hinge member D to open and closed positions of the valve C relative to the valve seat B, as will be described.

It will be clear that the structure just described constitutes within itself a check or foot valve permitting flow in one direction, but preventing flow in the opposite direction. This flow is from left to right as viewed in Figs. 3 to 6 of the drawings. However, a particular advantage of the present invention resides in the unique valve-closing action provided by the toggle linkage E. This linkage is provided by the links F, F' and the spiral coil springs G. Each of the links F, F' is a channel member having elongated sides apertured at both ends. The upper link F is supported by a pin 23 extending through apertures in the mounting bracket M. Endwise movement of the pin 23 may be prevented by cotter pins 24 in a well-known manner. The lower link F' is pivotally secured to the hinged valve structure by a pin 25 supported in the lower end of the hinge member D. Cotter pins 26 may also be provided in the ends of the pin 25, as before. The two links F, F' are pivotally connected at a common joint provided by a knee pin 27, secured against endwise movement by the ends of the springs which engage in annular grooves 27a cut near the ends of the pin 27. Pressure is applied to the knee joint 27 by means of the expanded springs G.

Figs. 3 and 5 illustrate the operation of the toggle mechanism E when the valve is in a closed position. As shown, the links F, F' form a relatively flat obtuse angle $\phi$. As a result a comparatively small force effectively applied at the common joint 27 and acting in a direction tending to straighten out the links is capable of exerting a large pressure at the moving end, which in the present application is the end secured to the valve clapper. This feature is diagrammatically illustrated in Fig. 5 where the relatively small pressure exerted by the springs G is represented by the letter P, while the resulting much larger pressure exerted by the toggle linkage E is represented by $R_1$, while $R_2$ represents the ultimate closing pressure exerted on the valve clapper C. Due to this multiplication of pressures, the valve C is firmly urged against the valve seat B and through compression of the rubber valve face 13 a gasketing effect is achieved that insures an absolutely leak-tight seal.

The operation of the toggle linkage E in an open position of the valve is illustrated in Figs. 4 and 6. In this position the valve has been pushed open and is being held open by liquid flow through the valve, indicated by the flow arrow at the left of 6. As a result, the toggle linkage E has assumed the relatively pointed acute angle designated by $\theta$. However, by a reverse linkage inherent in the toggle action, a comparatively large pressure in a direction tending to straighten out the linkage will produce only a relatively small pressure at the moving end of the linkage secured to the valve clapper C. This principle is diagrammatically illustrated in Fig. 6 where the increased pressure P exerted by the springs G, under considerable expansion, produces only a small resulting force $R_1$ which produces an even smaller valve closing pressure $R_2$. The ultimate effect of this reverse linkage is a relatively small pressure loss across the valve due to so much less energy being required to hold the valve open as compared to that required in the first instance to swing it open. This feature is particularly important in forced circulation system utilizing the pump, since only a relatively small portion of the pump's energy must be diverted to the task of holding the valve open once it is opened. This results in achieving a maximum pumping efficiency in the line. It also gives another important operating characteristic, namely, that as soon as the fluid flow has almost ceased, the clapper C will immediately begin to close and, while there is still a slight flow, the clapper C will close on its seat 15. This assures that a full column of fluid will be trapped in the pipe and, more important, it prevents any possibility of water hammer. Also, portions of the sides 19 of the mounting bracket M may be cut away, as at 34, to facilitate a free, full opening movement of the valve C.

The overall operation of the valve will now be described. In foot valve applications the valve will be positioned at the intake side of a suction line or under the surface of the liquid to be pumped. Consequently, when the pump is put in operation, the suction created within the valve body will cause liquid pressure to be exerted on the face of the valve C against the pressure exerted by the toggle closing mechanism E. This pressure will ultimately force the valve into the full open position of Figs. 4 and 6.

When the valve has been pushed to a point where the angle between the links F, F' becomes somewhat less than 90°, the reverse linkage effect will begin to decrease the closing pressure being applied to the valve C by the springs G until in the full open position of Figs. 4 and 6 the spring pressure is at its minimum so that the valve C will exert a relatively small retarding force on the flow of liquid through the valve. As a result, the flow through the valve during its operation is substantially unrestricted so that there is a minimum pressure loss in maintaining the valve in an open position, and yet the valve will be instant in closing upon stoppage in flow.

When the pump is stopped, the gentle closing pressure exerted on the valve in its open position begins to take effect. This closing pressure quickly but gradually increases with the increasing angle between the links F, F' until, finally, the tightly-closed valve position of Figs. 3 and 5 is reached. The valve action thus produced will cause the valve C to close just prior to a stopping and reversal of fluid flow which would otherwise occur, thereby providing a smooth, even, non-slam valve-closing action. In this way the effects of a faulty or retarding valve-closing action, such as a water hammer, are prevented and the valve traps a full column of fluid in the pipe.

In check valve applications, the valve structure would be positioned on the discharge side of the pump with the valve normally in a closed position when the pump is not in operation. This would assure maintenance of a column of water to hold the prime in the pump. When the pump is started, water pressure is created on the left or face side of the valve C, as before, with a similar valve action occurring as the valve is pushed by the flow of water to the open position of Figs. 4 and 6. When the pump is shut off, the diminishing water flow through the valve permits the valve-closing pressure exerted by the toggle linkage E to take effect in similar fashion to the valve-closing action just described in connection with its use as a foot valve. Thus it will be clear that the unique valve action provided by the toggle action E is particularly adaptable to either check or foot valve applications and in each case will result in an even, positive, non-slam valve action which will not only provide an absolutely leak-tight seal, but which also will offer a minimum of resistance to liquid flow through the valve during operation.

To those skilled in the art to which this invention relates, many changes in construction and widely differing embodiments and applications of the invention will suggest themselves without departing from the spirit and scope of the invention. For example, pressure could be applied to the toggle linkage from the opposite side with equal success. Likewise, many structural variations are contemplated such as other or different types of pressure-applying means or pairs of elements instead of the single channel members illustrated. It should be understood that the disclosures and the description herein are purely illustrative and are not intended to be in any sense limiting.

We claim:

1. A check-and-foot valve adapted to prevent water hammer effect and offering a minimum of resistance to fluid flow through the valve comprising a valve body; a valve seat in said valve body; a valve adapted to close against said valve seat in a leak-tight manner; a hinge mounting said valve on the valve body for movement between open and closed positions; and toggle means linking said valve to said valve body to supply closing pressure to said valve, including a first link pivoted to said valve at a point spaced from said hinge; a second link pivoted to said valve body at a point spaced from said hinge, the total length of said two links being less than the sum of the distances betwen said hinge and the two pivots for the links; a common pivotal joint connecting said links; and spring means connecting said common joint to said valve body adjacent said hinge the relative positioning of said respective parts being such that in a closed valve position the link members form a relatively flat obtuse angle, and in an open valve position said link members form a relatively pointed acute angle; whereby in said closed-valve position the relatively smaller spring pressure of the less extended spring means is applied substantially fully in a direction tending to straighten out said links and results in a valve-closing pressure much larger than said spring pressure, while in said open-valve position the relatively larger spring pressure of the more extended spring means tending to straighten out said links results in a valve-closing pressure much smaller than either of said aforementioned spring pressures.

2. The valve of claim 1 in which said links are of substantially equal length and the pivots for said links lie at substantially equal distances from said hinge, and the spring means extends along the line between said hinge and said common pivotal joint.

3. A spring-loaded check-and-foot valve providing a leak-tight valve seal at relatively low loading or spring pressures and offering a minimum of frictional resistance to fluid flow therethrough when the volume of flow is sufficient to open the valve to the point where the toggle angle is somewhat less than 90°, comprising a valve body having a seat; a valve adapted to seal against said seat; a hinge on said valve body at the side of said seat mounting asid valve for movement between open and closed positions relative to said valve seat; and a toggle linkage between the valve and valve body and pressure-applying means operable on a knee joint of said toggle linkage tending to straighten it out, said toggle linkage comprising two links, one pivoted at one end to the valve at a spaced distance from said hinge, the other pivoted to one end to the valve body along a line at substantially a right angle to the closed position of the valve and at a space distance from said hinge, the other ends of said links being pivoted to each other, at said knee joint, the sum of said link lengths being less than the sum of distances from the link pivots to the hinge and greater than the direct distance between link pivots so that said toggle linkage assumes a relatively flat obtuse angle in a closed-valve position and a relatively pointed acute angle in an open position; and closure means exerting a maximum closing pressure on said valve in the closed position and a minimum closing force in the open position, thereby permitting a leak-tight closure while insuring a minimum pressure drop across the valve during operation.

4. The device of claim 3 in which said pressure-applying means is an expanded spring positioned within the angle formed by said toggle linkage and connected at one end to said knee joint and at its other end to the hinge.

5. A check-and-foot valve adapted to prevent water hammer effect and offering a minimum of resistance to fluid flow through the valve comprising a valve body; a valve seat in said valve body; a valve adapted to close against said valve seat in a leak-tight manner; a hinge mounting said valve on the valve body for movement between open and closed positions; and toggle means linking said valve to said valve body to supply closing pressure to said valve, including a first link pivoted to said valve at a point spaced from said hinge; a second link pivoted to said valve body at a point spaced from said hinge, the total length of said two links being less than the sum of the distances between said hinge and the two pivots for the links; a common pivotal joint connecting said links; and spring means urging said common joint toward said hinge the relative positioning of said respective parts being such that in a closed valve position the link members form a relatively flat obtuse angle, and in an open valve position said link members form a relatively pointed acute angle; whereby in said closed-valve position the relatively smaller spring pressure of the less extended spring means is applied substantially fully in a direction tending to straighten out said links and results in a valve-closing pressure much larger than said spring pressure, while in said open-valve position the relatively larger spring pressure of the more extended spring means tending to straighten out said links results in a valve-closing pressure much smaller than either of said aforementioned spring pressures.

References Cited in the file of this patent

UNITED STATES PATENTS

| | | |
|---|---|---|
| 554,928 | Ham | Feb. 18, 1896 |
| 888,368 | Trude | May 19, 1908 |
| 2,482,198 | Melichar | Sept. 20, 1949 |
| 2,556,277 | Hill | June 12, 1951 |